(12) United States Patent
Åström et al.

(10) Patent No.: US 12,659,207 B2
(45) Date of Patent: Jun. 16, 2026

---

(54) ADJUSTING PAPR IN A NETWORK NODE

(71) Applicant: Telefonaktiebolaget LM Ericsson (publ), Stockholm (SE)

(72) Inventors: Magnus Åström, Lund (SE); Niklas Andgart, Södra Sandby (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 607 days.

(21) Appl. No.: 18/009,141

(22) PCT Filed: Jun. 10, 2020

(86) PCT No.: PCT/EP2020/066023
§ 371 (c)(1),
(2) Date: Dec. 8, 2022

(87) PCT Pub. No.: WO2021/249630
PCT Pub. Date: Dec. 16, 2021

(65) Prior Publication Data
US 2023/0318897 A1 Oct. 5, 2023

(51) Int. Cl.
*H04L 27/26* (2006.01)
(52) U.S. Cl.
CPC ............................... *H04L 27/2614* (2013.01)
(58) Field of Classification Search
None
See application file for complete search history.

(56) References Cited

U.S. PATENT DOCUMENTS

| | | | | |
|---|---|---|---|---|
| 2019/0239176 A1* | 8/2019 | Lei | .................. | H04J 13/0062 |
| 2020/0059342 A1* | 2/2020 | Sahin | .................. | H04L 5/0094 |
| 2021/0044394 A1* | 2/2021 | Beale | .................. | H04W 72/121 |

FOREIGN PATENT DOCUMENTS

WO 2019/158606 A1 8/2019

OTHER PUBLICATIONS

International Search Report and Written Opinion issued in International Application No. PCT/EP2020/066023 dated Mar. 3, 2021 (11 pages).

(Continued)

*Primary Examiner* — Diane L Lo
(74) *Attorney, Agent, or Firm* — Rothwell, Figg, Ernst & Manbeck, PC

(57) ABSTRACT

A method for adjusting peak-to-average power ratio in a network node when transmitting multiple signals at respective multiple frequency locations is disclosed. The method comprises determining (101) a first signal at a first frequency location being intended for transmission simultaneously as a second signal at a second frequency location, manipulating the first and/or second signals by performing (103) an operation on the first and/or second signals, wherein the operation comprises one or more of: a time shift in a time domain or a frequency domain, and a phase shift in the time domain or the frequency domain, and transmitting (104) the first and second signals, as manipulated or non-manipulated, at the first and second frequency locations, respectively. Corresponding computer program product, network node, and wireless communication network are also disclosed.

20 Claims, 4 Drawing Sheets

(56) References Cited

OTHER PUBLICATIONS

Ericsson, "UE-group wake-up signal in LTE-MTC", 3GPP TSG-RAN WG1 Meeting #96bis, R1-1903882, Xi'an, P.R. China, Apr. 8-12, 2019 (16 pages).
Samsung, "UE-group wake-up signal for eMTC", 3GPP TSG RAN WG1 Meeting #96, R1-1902209, Athens, Greece, Feb. 25-Mar. 1, 2019 (4 pages).
Qualcomm Incorporated, "Detailed design for Wake-up signal sequence", 3GPP TSG RAN WG1 Meeting #93, R1-1807109, Busan, Korea, May 21-25, 2018 (12 pages).

* cited by examiner

ADJUSTING PAPR IN A NETWORK NODE

CROSS REFERENCE TO RELATED APPLICATIONS

This application is a 35 U.S.C. § 371 National Stage of International Patent Application No. PCT/EP2020/066023, filed 2020 Jun. 10.

TECHNICAL FIELD

The present disclosure relates generally to the field of wireless communication. More particularly, it relates to adjusting peak-to-average power ratio, PAPR, in a network node.

BACKGROUND

Wake-up signals are specified in the 3rd Generation Partnership Project (3GPP) Release 16. They are typically independent of which paging narrowband or paging carrier they are transmitted in. Hence, multiple wake-up signals may be transmitted at the same time.

A drawback of transmitting multiple wake-up signals at the same time is that PAPR may be increased (e.g., by up to 6 dB for the fraction of the carrier energy that comprise the wake-up signal).

Therefore, there is a need for approaches for adjusting PAPR in a network node when transmitting multiple signals.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an apparatus is referred to herein, it is to be understood as a physical product. The physical product may comprise one or more parts, such as controlling circuitry in the form of one or more controllers, one or more processors, or the like.

It is an object of some embodiments to solve or mitigate, alleviate, or eliminate at least some of the above or other drawbacks.

According to a first aspect, this is achieved by a method for adjusting peak-to-average power ratio in a network node when transmitting multiple signals at respective multiple frequency locations.

The method comprises determining a first signal at a first frequency location being intended for transmission simultaneously as a second signal at a second frequency location, and manipulating the first and/or second signals by performing an operation on the first and/or second signals, wherein the operation comprises one or more of: a time shift in a time domain or a frequency domain, and a phase shift in the time domain or the frequency domain.

The method further comprises transmitting the first and second signals, as manipulated or non-manipulated, at the first and second frequency locations, respectively.

In some embodiments, the method further comprises determining which operation to perform on the first and/or second signals based on a determined number of signals being intended for transmission simultaneously and/or based on a number of frequency locations.

In some embodiments, the operation performed on the first signal differs from the operation performed on the second signal.

In some embodiments, the determined signals are identical signals.

In some embodiments, the manipulation results in non-identical signals and/or non-simultaneously transmitted signals.

In some embodiments, the time shift in the time domain comprises an element-wise incremental phase shift in the frequency domain for all resource elements of a symbol in which the signal to be manipulated is allocated.

In some embodiments, the incremental phase shift comprises a positive time shift being multiplied with the first signal and/or a negative time shift being multiplied with the second signal.

In some embodiments, the phase shift in the time domain comprises an element-wise multiplication with a unit amplitude constant in the frequency domain for all resource elements of a symbol in which the signal to be manipulated is allocated.

In some embodiments, the multiple frequency locations comprise different paging narrowbands and/or different paging carriers.

In some embodiments, the first and/or second signals comprise copies of a wake-up signal or a set of wake-up signals allocated to different paging narrowbands and/or different paging carriers.

In some embodiments, the adjusting of the peak-to-average power comprises reducing the peak-to-average power.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a network node for adjusting peak-to-average power ratio in a network node when transmitting multiple signals at respective multiple frequency locations.

The network node comprises a controller being configured to cause determination of a first signal at a first frequency location being intended for transmission simultaneously as a second signal at a second frequency location, and manipulation of the first and/or second signals by performance of an operation on the first and/or second signals, wherein the operation comprises one or more of: a time shift in a time domain or a frequency domain, and a phase shift in the time domain or the frequency domain.

The controller being further configured to cause transmission of the first and second signals, as manipulated or non-manipulated, at the first and second frequency locations, respectively.

In some embodiments, the controller being further configured to cause determination of which operation to perform on the first and/or second signals based on a determined number of signals being intended for transmission simultaneously and/or based on a number of frequency locations.

In some embodiments, the operation performed on the first signal differs from the operation performed on the second signal.

In some embodiments, the determined signals are identical signals.

In some embodiments, the manipulation results in non-identical signals and/or non-simultaneously transmitted signals.

In some embodiments, the time shift in the time domain comprises an element-wise incremental phase shift in the frequency domain for all resource elements of a symbol in which the signal to be manipulated is allocated.

In some embodiments, the incremental phase shift comprises a positive time shift being multiplied with the first signal and/or a negative time shift being multiplied with the second signal.

In some embodiments, the phase shift in the time domain comprises an element-wise multiplication with a unit amplitude constant in the frequency domain for all resource elements of a symbol in which the signal to be manipulated is allocated.

In some embodiments, the multiple frequency locations comprise different paging narrowbands and/or different paging carriers.

In some embodiments, the first and/or second signals comprise copies of a wake-up signal or a set of wake-up signals allocated to different paging narrowbands and/or different paging carriers.

In some embodiments, the adjusting of the peak-to-average power comprises decreasing the peak-to-average power.

In some embodiments, the network node comprises a scheduler.

A fourth aspect is a wireless communication network comprising the network node according to the third aspect.

In some embodiments, the wireless communication network further comprises a user equipment, UE, configured to receive and process the first and/or second signals.

In some embodiments, the wireless communication network is configured for Long-Term Evolution Machine Type Communication, LTE-MTC, including enhanced Machine Type Communication, eMTC.

In some embodiments, the wireless communication network is configured for Narrowband Internet of Things, NB-IoT.

Any of the above aspects may additionally have features identical with or corresponding to any of the various features as explained above for any of the other aspects.

An advantage of some embodiments is that approaches for adjusting PAPR in a network node when transmitting multiple signals are provided.

Yet an advantage of some embodiments is that PAPR is decreased (e.g., compared to approaches of the prior art) while maintaining an ability to transmit multiple identical signals at the same time.

Yet an advantage of some embodiments is that higher power levels may be used (e.g., compared to approaches of the prior art) for signals assuming constant clipping interference.

Yet an advantage of some embodiments is that, when the signals are wake-up signals, then use of higher transmit power translates into that a shorter wake-up signal may be used (e.g., compared to approaches of the prior art). This may in turn improve system (i.e., wireless communication network) capacity and/or user equipment power efficiency.

It should be noted that, even if embodiments are described herein in the context of adjusting PAPR in a network node, some embodiments may be equally applicable and/or beneficial also in other contexts.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figures 1, 2:
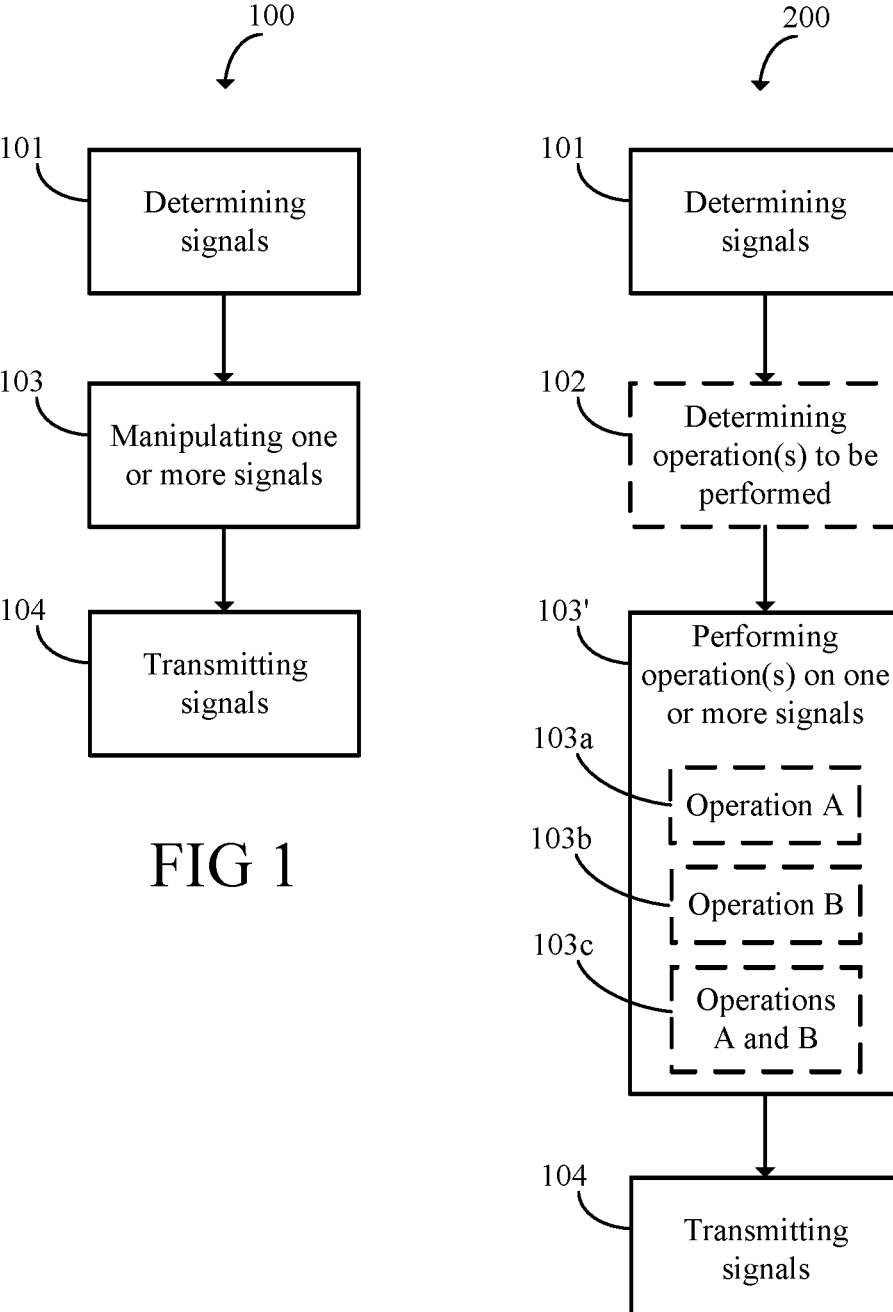
FIG. 1 is a flowchart illustrating example method steps according to some embodiments.
FIG. 2 is a flowchart illustrating example method steps according to some embodiments.

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In 3GPP, technologies have been specified to cover Machine-to-Machine (M2M) and/or Internet of Things (IoT) related use cases. For example, for 3GPP Release 13 and 14, the specifications include enhancements to support Machine-Type Communications (MTC) with new user equipment (UE) categories (Cat-M1, Cat-M2), supporting reduced bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2).

Long-Term Evolution (LTE) enhancements introduced in 3GPP Releases 13, 14, and 15 for MTC will hereinafter be referred to as enhanced MTC (eMTC), and may typically comprise support for bandwidth limited UEs, Cat-M1, and support for coverage enhancements.

Note that the term eMTC is introduced to separate discussion from NB-IoT (notation applicable for any Release).

There are multiple differences between "legacy" LTE and the procedures and channels defined for eMTC and for NB-IoT. Some differences are that the latter technologies may relate to a new physical channel, such as the physical downlink control channels, called MTC Physical Downlink Control Channel (MPDCCH) in eMTC, and Narrow Band Physical Downlink Control Channel (NPDCCH) in NB-IoT, and/or a new Physical Random Access Channel (NPRACH) for NB-IoT.

Another difference is the coverage level (also known as coverage enhancement level) that the latter technologies can support. By applying repetitions to the transmitted signals and channels, both eMTC and NB-IoT allow UE operation down to much lower signal-to-noise ratio (SNR) level compared to LTE, i.e. Es/Iot≥−15 dB being the lowest operating point for eMTC and NB-IoT which can be compared to −6 dB Es/IoT for "legacy" LTE.

In Release 15, there is a common objective in the approved work items (WI) for both NB-IoT and Release 15 enhancements for eMTC.

The description for NB-IoT is as follows:

A. Work on the following objectives to commence from RAN #75 (according to TU allocation per WG) and strive for completion by RAN #78:

Further Latency and Power Consumption Reduction:

Power consumption reduction for physical channels

Study and, if found beneficial, specify for idle mode paging and/or connected mode DRX, physical signal/channel that can be efficiently decoded or detected prior to decoding NPDCCH/NPDSCH. [RAN1, RAN2, RAN4].

The description for eMTC is as follows:

Improved Power Consumption:

Power consumption reduction for physical channels [RAN1 lead, RAN2, RAN4]

Study and, if found beneficial for idle mode paging and/or connected mode DRX, specify physical signal/channel that can be efficiently decoded or detected prior to decoding the physical downlink control/data channel.

The specification of Release 15 WUS is spread out over several parts of the LTE 36-series standard, e.g., technical specifications (TS) 36.211, 36.213, 36.304 and 36.331.

In the Release 16 Work Item Description (WID), it was agreed that WUS should be further developed to also include UE grouping, such that the number of UEs that are sensitive to the WUS is further narrowed down to a smaller subset of the UEs that are associated with a specific paging occasion (PO):

The objective is to specify the following set of improvements for machine-type communications for Bandwidth reduced Low complexity (BL)/Coverage Enhancement (CE) UEs.

Improved DL transmission efficiency and/or UE power consumption:

Specify support for mobile-terminated (MT) early data transmission (EDT) [RAN2, RAN3], Specify quality report in MSG3 at least for EDT [RAN1, RAN2], Specify aperiodic quality report in connected mode using same quality definition as in MSG3 [RAN1, RAN2, RAN4], Specify MPDCCH performance improvement by using CRS at least for connected mode [RAN1, RAN2, RAN4], Specify support for UE-group wake-up signal (WUS) [RAN1, RAN2, RAN4].

The Release 15 WUS was designed such that all UEs belong to the same group. A group may be defined in that a transmitted WUS associated to a specific paging occasion (PO) may wake-up all UEs that are configured to detect paging at that PO (in principle that is, however three different WUS gaps were introduce in Release 15; DRX, short extended DRX (eDRX), and long eDRX, which in practice means that there are three time multiplexed WUS groups already, i.e., the Release 15 could still be viewed as having three groups since the UE monitors different sets by use of the three different described DRX modes). Hence, in a group, all UEs which are not targeted by the page, will wake up unnecessarily.

Both eMTC and NB-IoT have been developed with varying applications in mind. Contrary to the mobile broadband (MBB) use case, the IoT realm have widely different use cases in terms of e.g., paging rates, latency, baseband processing power etc. In one network, a power switch for street lights effectively being paged once daily, with resulting extremely low paging rates may be deployed, whereas in another network, a machine controlling device may be paged on a second basis. For these two networks, it is apparent that paging will differ substantially, and, consequently, that the same UE-grouping configuration may be ill suited.

The Release 16 group WUS (gWUS) differs from Release 15 in two important ways:

1. The gWUS may be allocated to multiple resources in each paging narrowband, or paging carrier. In particular, for MTC, up to three WUSs including Release 15 WUS may be configured in a paging narrowband at the same time.

2. For each gWUS resource, multiple WUSs are configured where each WUS only triggers a subset of all UEs. A common WUS is then used to wake up all UEs that are allocated to that WUS resource.

For Release 16 WUS, PAPR may increase for one or more of the following reasons:

1. For MTC, WUS is duplicated between the two adjacent narrowbands for which it is configured.

For MTC, WUS is defined as the 1 PRB wide NB-IoT WUS that is duplicated twice in the frequency domain.

2. For both MTC and NB-IoT, if multiple paging narrowbands or paging carriers are configured, the same WUS may be transmitted in these.

The PAPR problem with the present WUS design may be identified with help of Fourier transform for the frequency translation property which states that:

$$\mathcal{F}^{-1}[X(\omega+\omega_0)]{=}x(t)e^{-\omega_0 t}$$

$X(\omega)$ is the frequency representation of x(t).

If $X(\omega)$ is shifted in the frequency domain, to $X(\omega+\omega 0)$, the time domain representation of that shift is:

$$x(t)e^{(-j\omega_0 t)}$$

The above can be interpreted as a shift in the frequency domain represented as a frequency modulation in the time domain.

Consequently, a signal that is repeated in the frequency domain, $X(j\omega)+X(j\omega+\omega\_0)$, has the following time domain expression:

$$\mathcal{F}^{-1}[X(\omega)+X(\omega+\omega_0)]{=}x(t)+x(t)e^{-\omega_0 t}$$

From the above is it clear that the two time domain sequences will add constructively at some time domain samples and destructively at others, depending on the normalized frequency shift $\omega\_0$ that is, in turn, related to the sampling rate. For the case where $\omega\_0{=}\pi$, i.e., the signal is shifted half the normalized bandwidth, the result is that all signal energy is allocated to every other sample whereas the other half is zero. Hence, as is seen above, signal amplitudes in half of the samples are doubled. Furthermore, since the same frequency shift applies to all 12 subcarriers, the constructive and destructive time domain samples will be the same for all subcarriers and PAPR accumulated correspondingly. As a consequence, WUS amplitudes in half of the samples are doubled and, hence, PAPR may be quadrupled, or increased by up to 6 dB.

Hence, as mentioned above, a drawback of transmitting multiple identical signals at the same time is that PAPR may be increased by up to 6 dB for the fraction of the carrier energy that comprise the wake-up signal.

A further drawback is that the wake-up signal may be power boosted up to 4.8 dB which makes the PAPR even worse.

In the following, embodiments will be presented where approaches for adjusting PAPR in a network node when transmitting multiple signals are described.

Multiple signals, as described herein, may typically comprise copies of a wake-up signal or a set of wake-up signals allocated to different paging narrowbands and/or different paging carriers.

Alternatively or additionally, properties of the wake-up signal sequence may be selected to provide very good timing alignment, i.e., concentrating its autocorrelation function into one sample, and thereby a small time shift is sufficient to decorrelate the shifted and unshifted signals.

Network node, as described herein, may typically comprise a node in or for a wireless communication network and the node may typically comprise a scheduler.

It should be noted that, even if embodiments are described herein in the context of adjusting peak-to-average power ratio in a network node when transmitting multiple signals at respective multiple frequency locations, some embodiments may be equally applicable and/or beneficial also in other contexts wherein peak-to-average power ratio is adjusted in a network node.

It should further be noted that, even if embodiments are described herein in the context of a network node, some embodiments may be equally applicable and/or beneficial also in other contexts wherein peak-to-average power ratio is adjusted in a user equipment when transmitting multiple signals at respective multiple frequency locations.

It should furthermore be noted that, even if embodiments are described herein in the context of a first and/or second signals at respective first and/or second frequency locations being intended for transmission simultaneously, some embodiments may be equally applicable and/or beneficial also in other contexts wherein a first and/or second and/or third signals at respective first and/or second and/or third frequency locations being intended for transmission simultaneously.

FIG. 1 is a flowchart illustrating method steps of an example method 100 according to some embodiments. The method 100 is for adjusting peak-to-average power ratio in a network node when transmitting multiple signals at respective multiple frequency locations. Thus, the method 100 (or steps thereof) may, for example, be performed by the apparatus 400 and/or the controller 410 of FIG. 4; all of which will be described later herein.

The method 100 comprises the following steps.

In step 101, a first signal is determined at a first frequency location being intended for transmission simultaneously as at least a second signal at a second frequency location.

In step 103, the first and/or second signals are manipulated by performing an operation on the first and/or second signals.

In step 104, the first and second signals are transmitted, as manipulated or non-manipulated, at the first and second frequency locations, respectively.

Any of the above steps for FIG. 1 may additionally have features which are identical with or corresponding to any of the various features as explained below for FIGS. 2-5, as suitable.

FIG. 2 is a flowchart illustrating method steps of an example method 200 according to some embodiments. The method 200 is for adjusting peak-to-average power ratio in a network node when transmitting multiple signals at respective multiple frequency locations. Thus, the method 200 (or steps thereof) may, for example, be performed by the apparatus 400 and/or the controller 410 of FIG. 4; all of which will be described later herein.

The method 200 comprises the following steps.

In step 101, a first signal is determined at a first frequency location being intended for transmission simultaneously as a second signal at a second frequency location (corresponding to step 101 of FIG. 1).

In some embodiments, the determined signals are identical signals.

For example, the network node identifies that the determined signals are identical signals by identifying in a scheduler of the network node that both signals are wake-up signals, i.e. a wake-up signal group, and that both wake-up signals/wake-up signal group are used in two frequency locations.

In optional step 102, in some embodiments, which operation to perform on the first and/or second signals is determined based on a determined number of signals being intended for transmission simultaneously and/or based on a number of frequency locations.

Alternatively or additionally, which operation to perform on the first and/or second signals is determined based on specified operations for the network node and/or a wireless communication network comprising the network node.

In step 103', the first and/or second signals are manipulated by performing an operation on the first and/or second signals (corresponding to step 103 of FIG. 1).

Alternatively or additionally, the performed operation may comprise one or more operations, i.e., one operation or a combination of two or more operations.

In some embodiments, the operation performed on the first signal differs from the operation performed on the second signal.

For example, the network node performs an operation on either or both of the first and/or second signals such that the two signals are no longer identical or transmitted simultaneously, or both.

In step 103a, "Operation A", the first and/or second signals are manipulated by performing a time shift in a time domain or a frequency domain.

In some embodiments, the time shift in the time domain comprises an element-wise incremental phase shift in the frequency domain for all resource elements of a symbol in which the signal to be manipulated is allocated.

Alternatively or additionally, the element-wise incremental phase shift in the frequency domain is based on the following inverse Fourier transform:

$$\mathcal{F}^{-1}[X(\omega)e^{-j\omega_0 t}] = x(t-t_0)$$

In some embodiments, the incremental phase shift comprises a positive time shift being multiplied with the first signal and/or a negative time shift being multiplied with the second signal.

For example, the network node performs a slight time shift on either or both of the first and/or second signals.

In step 103b, "Operation B", the first and/or second signals are manipulated by performing a phase shift in the time domain or the frequency domain.

In some embodiments, the phase shift in the time domain comprises an element-wise multiplication with a unit amplitude constant in the frequency domain for all resource elements of a symbol in which the signal to be manipulated is allocated.

Alternatively or additionally, the phase shift as described above is performed in the frequency domain as an element-wise multiplication with a unit amplitude constant, e.g., j, such that the real and imaginary components of the signal are switched.

For example, the network node performs a phase shift on either or both of the first and/or second signals.

In step 103*c*, "Operation A and B", the first and/or second signals are manipulated by performing a time shift in a time domain or a frequency domain and a phase shift in the time domain or the frequency domain.

Alternatively or additionally, a combination of time shift(s) and phase shift(s) are utilized in case that more than two paging narrowbands or paging carriers are used such that the total number of identical signals are more than two.

For example, the network node performs a slight time shift and a phase shift on either or both of the first and/or second signals.

In some embodiments, the manipulation results in non-identical signals and/or non-simultaneously transmitted signals.

In step 104, the first and second signals are transmitted, as manipulated or non-manipulated, at the first and second frequency locations, respectively (corresponding to step 104 of FIG. 1).

In some embodiments, the multiple frequency locations comprise different paging narrowbands and/or different paging carriers.

In some embodiments, the first and/or second signals comprise copies of a wake-up signal or a set of wake-up signals allocated to different paging narrowbands and/or different paging carriers.

For example, respective set of wake-up signals being allocated to different frequency resources are transmitted on the same resource within the paging narrowband or paging carrier but in different paging narrowband or paging carriers as specified by the network.

In some embodiments, the adjusting of the peak-to-average power comprises reducing the peak-to-average power.

Any of the above steps for FIG. 2 may additionally have features identical with or corresponding to any of the various features as explained below for FIGS. 3-5, as suitable.

Figure 3A:
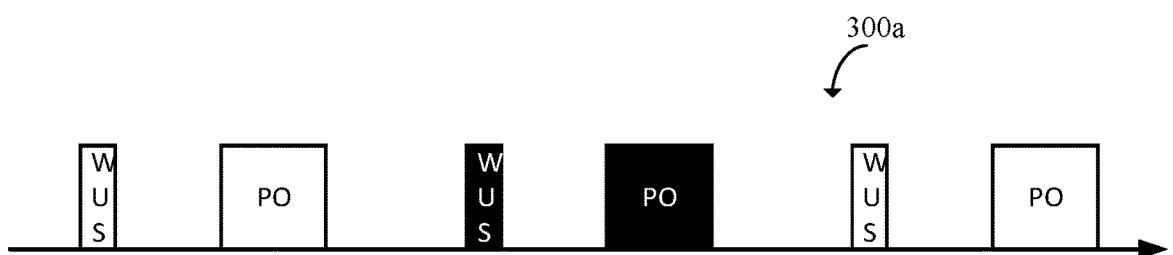
FIG. 3a is a schematic drawing illustrating example signals according to some embodiments.

FIG. 3*a* is a schematic drawing illustrating example signals 300*a* according to some embodiments. The illustrated signals are wake-up signals (WUS) and associated paging occasion (PO) positions.

The white blocks indicate location of a possible WUS and associated PO positions whereas the black boxes indicate actual WUS and associated PO positions.

A WUS is typically based on transmission of a short signal that indicates to a UE that it should continue to decode the downlink (DL) control channel, e.g., full NPDCCH for NB-IoT. If such signal is absent (i.e., UE does not detect it) then the UE can go back to sleep without decoding the DL control channel. The decoding time for a WUS is typically considerably shorter than that of the full NPDCCH since it essentially only needs to contain one bit of information whereas the NPDCCH may contain up to 35 bits of information. This, in turn, reduces UE power consumption and leads to longer UE battery life.

The WUS is typically transmitted only when there is paging for the UE. Correspondingly, if there is no paging for the UE the WUS will typically not be transmitted and the UE can go back to (or remain in) sleep upon non-detection of WUS.

Hence, after listening at the WUS locations, the UE may ignore the subsequent PO position responsive to non-detection of WUS, and may receive and attempt to decode the subsequent PO position responsive to detection of WUS.

Figure 3B:
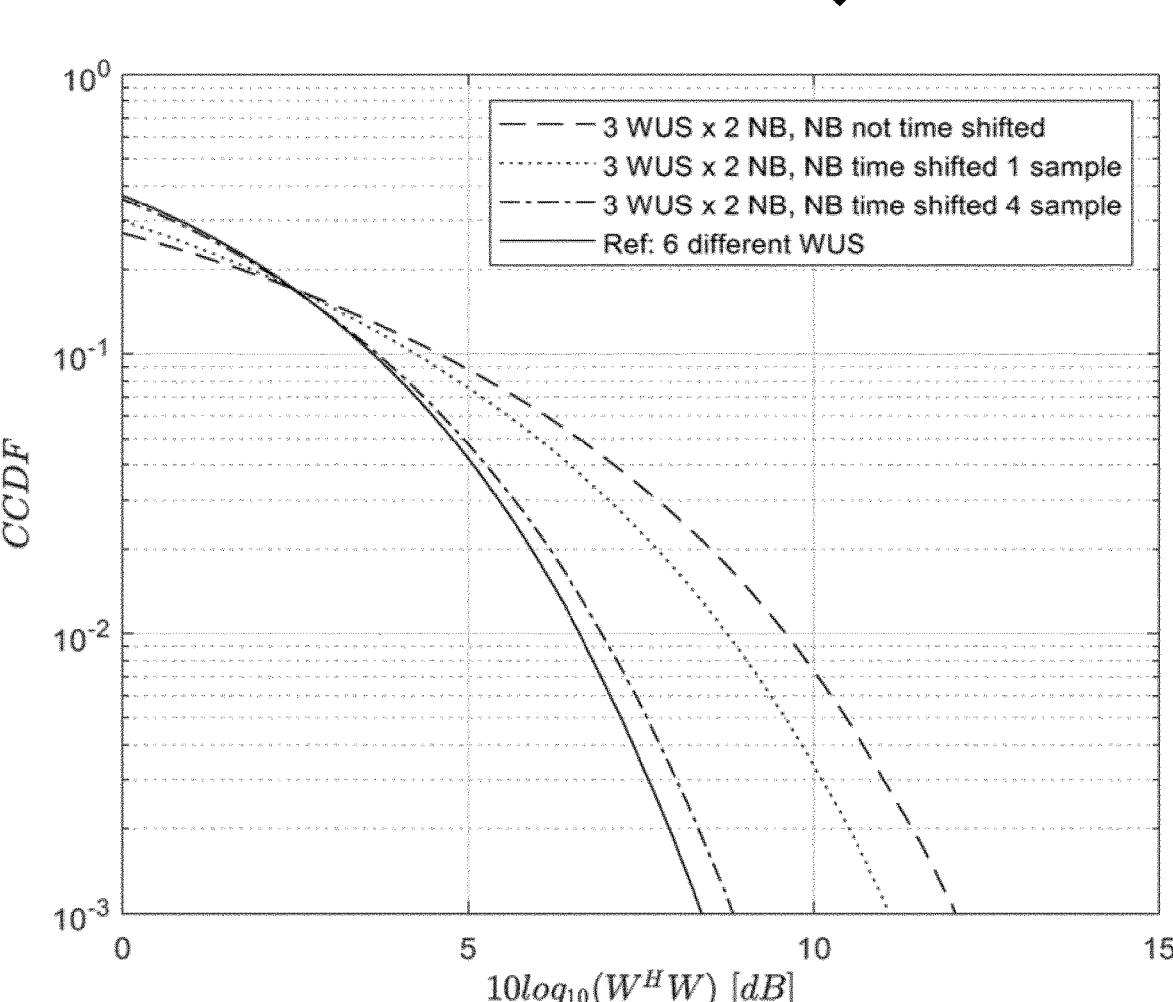
FIG. 3b is a graph illustrating example results achievable according to some embodiments.

FIG. 3*b* is a graph illustrating example results achievable 300*b* according to some embodiments. The illustrated curves are illustrative of the results achievable and of performance in terms of peak-to-average power ratio for three different signals.

The Y-axis is indicative of a complementary cumulative distribution function (CCDF) and the X-axis is indicative of an absolute power per sample and PAPR, wherein a lower PAPR results in the curve being on the left of the X-axis and a higher PAPR results in the curve being on the right of the X-axis.

FIG. 3*b* illustrates the PAPR performance for different signal designs and different time offsets between signals in two narrowbands. The assumed group WUS resource configuration is 3 frequency multiplexed WUS resources per paging narrowband and two narrowbands are configured in total (reference to FIG. 3*c*).

The different signal designs are as follows:

1. Different signals are used in different WUS resources within a narrowband but repeated between the two narrowbands, illustrated in curve with dashed line "3WUS×2 NB, NS not time shifted". This signal corresponds to the Release 16 group WUS design.

2. In the same manner as for the dashed line, as described above (i.e., different WUS resources within a narrowband but repeated between the two narrowbands), but with the signals in the two narrowbands being time shifted 1 sample, illustrated in curve with dotted line "3 WUS×2NB, NB time shifted 1 sample". 3. In the same manner as for the dashed line, as described above (i.e., different WUS resources within a narrowband but repeated between the two narrowbands), but with the signals in the two narrowbands being time shifted 4 samples, illustrated in curve with dash-dotted line "3 WUS×2NB, NB time shifted 4 sample". 4. Reference signal where all 6 WUS differ, i.e., there is no correlation amongst the signals, illustrated in curve with solid line "Ref: 6 different WUS".

The PAPR performance is presented in terms of CCDF curves for three time shifts between the two narrowbands; 0 sample time shift, 1 sample time shift (0.52 μs), and 4 samples time shift (2.1 μs). It is evident from the graph 300*b* that PAPR value is decreased already with the 1 sample times shift but is substantially decreased for the 4 samples time shift. According to the above description, in a 2 PNB network configuration, 2.1 μs relative time shift may be achieved by shifting each PNB half (1.05 μs) and thereby minimizing the worst-case timing error that is introduced from the time shift.

From the UE side, the time shift will be seen as a resulting time shift after the correlation in the WUS receiver. It can be noted that since the UE in sleep has less precision of timing estimates, it is anyway prepared for slight timing changes when decoding the WUS. Further, the time shifts discussed above of up to 2.1 ms are well within the cyclic prefix length of about 5 ms.

If a phase shift of the WUS is employed by the network node, eNb, it will merely show up as a corresponding phase shift in the receiver correlation, i.e., the absolute value used in the peak detection will be unchanged. Since the UE does not have a reliable channel estimate for detecting WUS, this phase shift is acceptable.

Figure 3C:
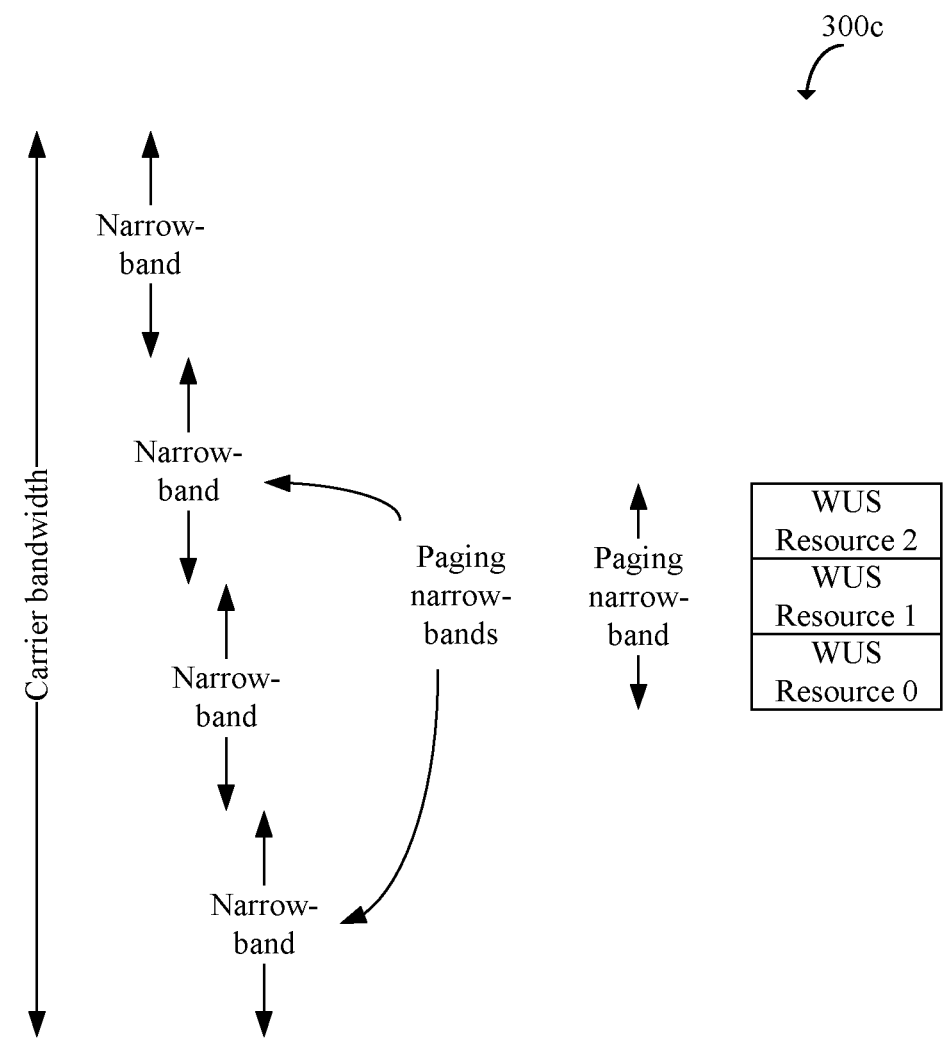
FIG. 3c is a schematic drawing illustrating example resources according to some embodiments.

FIG. 3*c* is a schematic drawing illustrating example resources 300*c* according to some embodiments. The illustrated resources 300*c* are physical resource blocks (PRB).

FIG. 3c illustrates WUS sources, i.e., WUS 0, WUS1, and WUS 2, each comprising 2 PRB and a narrowband being 6 PRB wide (corresponding to the PRB of WUS 0, WUS1, and WUS2).

In reference to FIG. 3b, WUS0, WUS1 and WUS2 are different within a narrowband, but WUS0 is the first narrowband is identical to the WUS0 in the second narrowband, and same relation goes for WUS1 and WU2.

Figure 4:
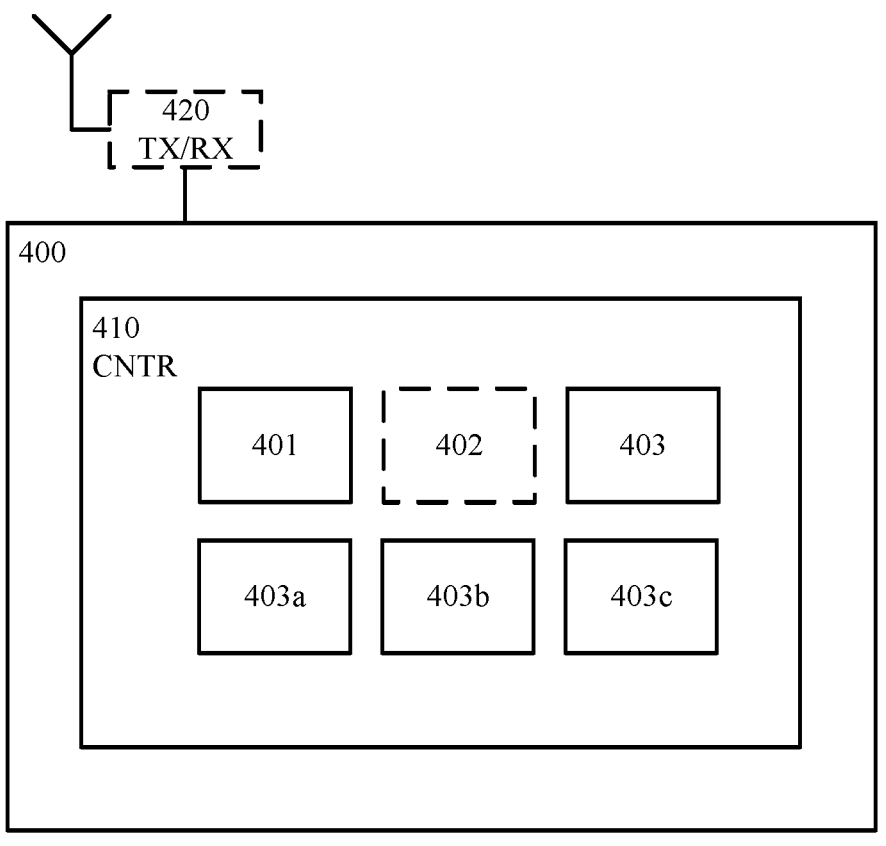
FIG. 4 is a schematic block diagram illustrating an example apparatus according to some embodiments.

FIG. 4 is a schematic block diagram illustrating an example apparatus 400 according to some embodiments. The apparatus 400 is for adjusting peak-to-average power ratio in a network node when transmitting multiple signals at respective multiple frequency locations. Thus, the apparatus 400 and/or the controller 410 may, for example, be configured to perform one or more of the steps of FIG. 1, and/or FIG. 2, and/or one or more of any steps otherwise described herein.

The apparatus 400 is for adjusting peak-to-average power ratio in a network node when transmitting multiple signals at respective multiple frequency locations.

The apparatus 400 comprises a controller 410, e.g. device controlling circuitry, configured to cause determination of a first signal at a first frequency location being intended for transmission simultaneously as a second signal at a second frequency location, and manipulation of the first and/or second signals by performance of an operation on the first and/or second signals, wherein the operation comprises one or more of: a time shift in a time domain or a frequency domain, and a phase shift in the time domain or the frequency domain.

The controller 410 is further configured to cause transmission of the first and second signals, as manipulated or non-manipulated, at the first and second frequency locations, respectively.

The apparatus 400 comprises, as mentioned above, the controller (CNTR; e.g., control circuitry or a controlling module) 410, which may in turn comprise, (or be otherwise associated with; e.g., connected or connectable to), a determiner 401, e.g. determining circuitry or determining module, configured to determine a first signal at a first frequency location being intended for transmission simultaneously as a second signal at a second frequency location (compare with step 101 of FIG. 1 and/or FIG. 2).

In some embodiments, the determined signals are identical signals.

The controller 410 further comprises, (or is otherwise associated with; e.g., connected or connectable to), a manipulator 403, e.g. manipulating circuitry or manipulating module, configured to manipulate the first and/or second signals by performance of an operation on the first and/or second signals (compare with step 103 of FIG. 1 and/or step 103' of FIG. 2).

In some embodiments, the manipulation results in non-identical signals and/or non-simultaneously transmitted signals.

The controller 410 further comprises, (or is otherwise associated with; e.g., connected or connectable to), a shifter 403a, e.g. shifting circuitry or shifting module, configured to cause a time shift in a time domain or a frequency domain (compare with step 103a of FIG. 2), a shifter 403b, e.g. shifting circuitry or shifting module, configured to cause a phase shift in the time domain or the frequency domain (compare with step 103b of FIG. 2), and a shifter 403c, e.g. shifting circuitry or shifting module, configured to cause a time shift in a time domain or a frequency domain and a phase shift in the time domain or the frequency domain (compare with step 103c of FIG. 2).

In some embodiments, the time shift in the time domain comprises an element-wise incremental phase shift in the frequency domain for all resource elements of a symbol in which the signal to be manipulated is allocated.

In some embodiments, the incremental phase shift comprises a positive time shift being multiplied with the first signal and/or a negative time shift being multiplied with the second signal.

In some embodiments, the phase shift in the time domain comprises an element-wise multiplication with a unit amplitude constant in the frequency domain for all resource elements of a symbol in which the signal to be manipulated is allocated.

The controller 410 further comprises, (or is otherwise associated with; e.g., connected or connectable to), a transceiver TX/RX 420, e.g. transceiving circuitry or transceiving module, configured to transmit the first and second signals, as manipulated or non-manipulated, at the first and second frequency locations, respectively (compare with step 104 of FIG. 1 and/or FIG. 2).

In some embodiments, the controller 410 further comprises, (or is otherwise associated with; e.g., connected or connectable to), a determiner 402, e.g. determining circuitry or determining module, configured to determine which operation to perform on the first and/or second signals based on a determined number of signals being intended for transmission simultaneously and/or based on a number of frequency locations (compare with step 102 of FIG. 2).

In some embodiments, the operation performed on the first signal differs from the operation performed on the second signal.

In some embodiments, the apparatus 400 is completely or partially comprised in a network node.

In some embodiments, the apparatus 400 and/or the network node is completely or partially comprised in in a cloud environment.

In some embodiments, a wireless communication network comprises the apparatus 400 and/or the network node.

In some embodiments, the wireless communication network comprises a UE configured to receive and process the first and/or second signals.

In some embodiments, the wireless communication network is configured for Long-Term Evolution Machine Type Communication, LTE-MTC, including enhanced Machine Type Communication, eMTC.

In some embodiments, the wireless communication network is configured for Narrowband Internet of Things, NB-IoT.

Generally, when an apparatus is referred to herein, it is to be understood as a physical product. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), Graphics Processing Units (GPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM).

Figure 5:
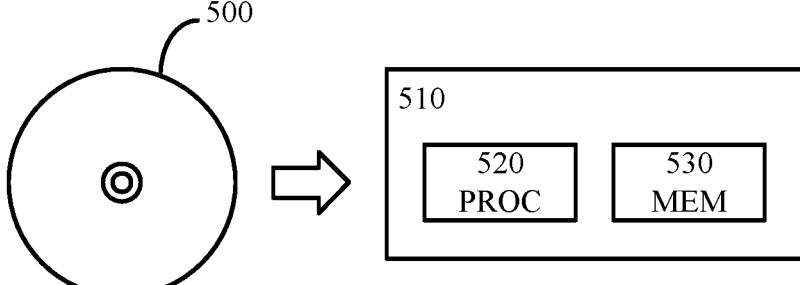
FIG. 5 is a schematic drawing illustrating an example computer readable medium according to some embodiments.

FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a wireless communication device 510. When loaded into the data processor, the computer program may be stored in a memory (MEM) 530 associated with or comprised in the data processor.

In some embodiments, the computer program may, when loaded into and run by the data processing unit, cause execution of steps according to, for example, FIG. 1 and/or one or more of any steps otherwise described herein.

In some embodiments, the computer program may, when loaded into and run by the data processing unit, cause execution of steps according to, for example, FIG. 1 and/or FIG. 2 and/or one or more of any steps otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for adjusting peak-to-average power ratio in a network node when transmitting multiple signals at respective multiple frequency locations, the method comprising the steps of:
  determining that a first signal is intended for transmission simultaneously with a second signal;
  manipulating the first signal by performing an operation on the first signal, wherein the operation comprises one or more of: a time shift within a cyclic prefix length of a symbol in a time domain or a frequency domain, or a phase shift in the time domain or the frequency domain; and
  transmitting the manipulated first signal at a first frequency location and the second signal at a second frequency location.

2. The method of claim 1, further comprising the step of:
  determining which operation to perform on the first and/or second signals based on a determined number of signals being intended for transmission simultaneously and/or based on a number of frequency locations.

3. The method of claim 1, wherein the operation performed on the first signal differs from the operation performed on the second signal.

4. The method of claim 1, wherein the determined signals are identical signals.

5. The method of claim 1, wherein the manipulation results in non-identical signals and/or non-simultaneously transmitted signals.

6. The method of claim 1, wherein the time shift in the time domain comprises an element-wise incremental phase shift in the frequency domain for all resource elements of the symbol in which the signal to be manipulated is allocated.

7. The method of claim 6, wherein the incremental phase shift comprises a positive time shift being multiplied with the first signal and/or a negative time shift being multiplied with the second signal.

8. The method of claim 1, wherein the phase shift in the time domain comprises an element-wise multiplication with a unit amplitude constant in the frequency domain for all resource elements of the symbol in which the signal to be manipulated is allocated.

9. The method of claim 1, wherein the multiple frequency locations comprise different paging narrowbands and/or different paging carriers.

10. The method of claim 1, wherein the first and/or second signals comprise copies of a wake-up signal or a set of wake-up signals allocated to different paging narrowbands and/or different paging carriers.

11. The method of claim 1, wherein the adjusting of the peak-to-average power comprises reducing the peak-to-average power.

12. A computer program product comprising a non-transitory computer readable medium storing a computer program for configuring a network node to perform the method of claim 1.

13. A network node for adjusting peak-to-average power ratio in a network node when transmitting multiple signals at respective multiple frequency locations, the network node comprising a controller configured to cause the network node to perform a method comprising:
  determining that a first signal is intended for transmission simultaneously with a second signal;
  manipulating the first signal by performing an operation on the first signal, wherein the operation comprises one or more of: a time shift within a cyclic prefix length of a symbol in a time domain or a frequency domain, or a phase shift in the time domain or the frequency domain; and transmitting the manipulated first signal at a first frequency location and the second signal at a second frequency location.

14. The network node of claim 13, the controller being further configured to cause:

determination of which operation to perform on the first and/or second signals based on a determined number of signals being intended for transmission simultaneously and/or based on a number of frequency locations.

15. The network node of claim 13, wherein the operation performed on the first signal differs from the operation performed on the second signal.

16. The network node of claim 13, wherein the determined signals are identical signals.

17. The network node of claim 13, wherein the manipulation results in non-identical signals and/or non-simultaneously transmitted signals.

18. The network node of claim 13, wherein the time shift in the time domain comprises an element-wise incremental phase shift in the frequency domain for all resource elements of the symbol in which the signal to be manipulated is allocated.

19. The network node of claim 18, wherein the incremental phase shift comprises a positive time shift being multiplied with the first signal and/or a negative time shift being multiplied with the second signal.

20. The network node of claim 13, wherein the phase shift in the time domain comprises an element-wise multiplication with a unit amplitude constant in the frequency domain for all resource elements of the symbol in which the signal to be manipulated is allocated.

* * * * *